July 27, 1948.                F. J. McCULLOUGH                2,446,054
                          LIQUID TEMPERATURIZING VAT
                              Filed July 9, 1947
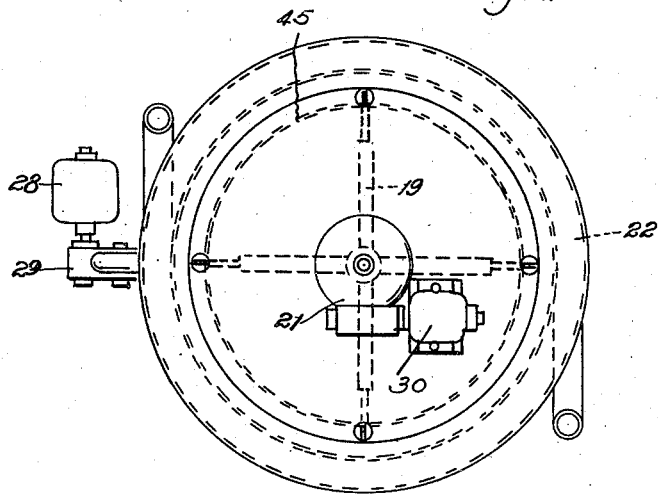
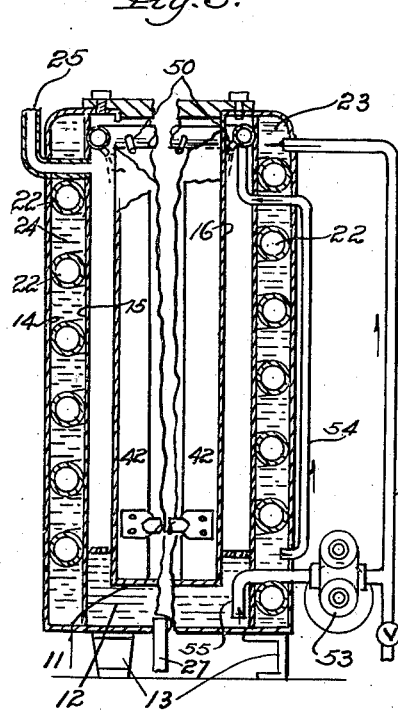
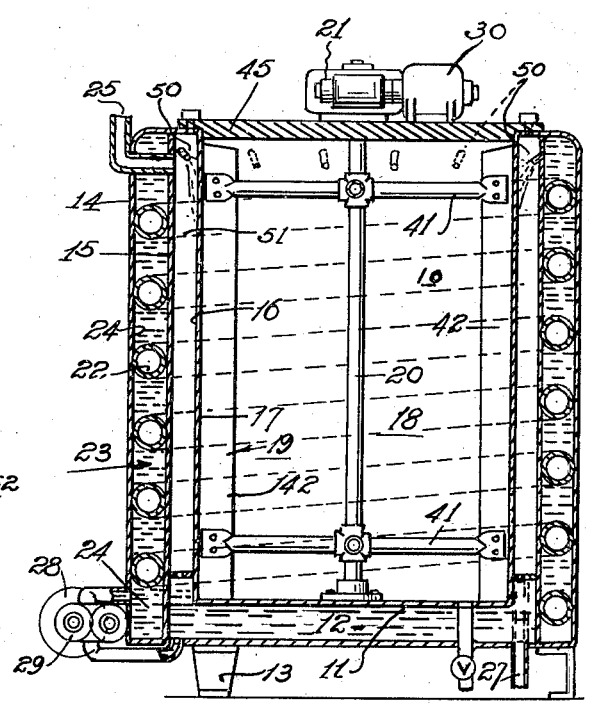
Inventor.
Francis J. McCullough.
by McKnight and Comstock
Attorneys.

Patented July 27, 1948

2,446,054

UNITED STATES PATENT OFFICE 2,446,054

LIQUID TEMPERATURIZING VAT

Francis J. McCullough, Chicago, Ill.

Application July 9, 1947, Serial No. 759,863

4 Claims. (Cl. 257—108)

My invention relates to a vat for cooling or heating and agitating liquid such as milk, cream or the like.

Among the objects of my invention is to provide a cooling or heating coil spiralling upwardly between two walls and providing a spiral pathway for cooling or heating water, which is then sprayed as it falls against the lining of the vat for cooling or heating the milk or the like, contained therein.

My invention also contemplates such other objects, advantages and capabilities which are inherently possessed by my invention and which will later more fully appear.

While I have shown in the accompanying drawing a preferred form of my invention, yet I wish it understood that the same is susceptible of modification and change without departing from the spirit of my invention.

Referring to the drawing, Fig. 1 is a top plan view of my liquid temperaturizing vat; Fig. 2 is a detailed vertical sectional view of the same; and Fig. 3 is a broken detailed vertical sectional view of a modified form of my liquid temperaturizing vat.

The embodiment selected to illustrate my invention comprises a vat 10, having a closed bottom portion 11, with a hollow interior or well 12, below closed bottom portion 11.

The bottom portion 11 has suitable legs 13, for supporting the vat on the floor or other support. The sides of the vat are closed by an outer shell 14 and the top by a removable cover 45.

Located inwardly from said outer shell 14 are a pair of laterally spaced and vertically extending walls, 15 and 16. The inner of the two walls 16, forms the lining 17, for the container or tank 18 into which is poured the milk or other liquid to be stored and treated therein.

An agitator 19 has a vertical rod 20 mounted on the top of bottom portion 11 and has a pair of spaced arms 41, to the outer ends of which are attached scraper blades 42 adapted to contact lining 17. Agitator 19, is operated by motor 30 through speed reduction member 21.

A hollow pipe coil 22, located in the space 23 between walls 14 and 15 winds its way spirally upwardly from the bottom of said space to the top thereof. The coil 22 is of such a diameter as to fill the space 23 laterally and contacts the inner portions of walls 14 and 15 leaving a spiral pathway 24.

In use, brine, ammonia or other cooling or heating liquid flows through coil 22.

In use, cover 45 is removed, and milk, cream or other desired liquid is poured into container 18 through the open top. Water is introduced into well 12 from pipe 25 leading to a source of water supply.

Motor 28 supported adjacent base 11 is operated and actuates pump 29 which forces the water upwardly from well 12 into spiral pathway 24, formed by the outside of coil 22 and walls 14 and 15. When the water reaches the top of pathway 24, it is directed by sprays 50 into space 51, between wall 15 and 16. The water then drops against wall 16 cooling or heating the same, and then falling into well 12 for recirculation. Overflow 27 is provided to drain off excess water.

While the water is circulating, motor 30 is operated and through speed reduction means 21 rotates agitator 19.

The water continuously circulating in pathway 24 is in constant contact with cold or warm coil 22. When the water reaches the top of pathway 24 it has been cooled or heated to the desired temperature and imparts such temperature change to the wall 16 as it is sprayed and falls thereagainst. This provides a uniform cooling or heating to wall 16. The thus temperaturized wall 16 provides blades 22 of agitator 19 with cold or warm contact for more efficiently cooling or warming the milk or other liquid in container 18. It is also to be noted that the bottom of container 18, lies in and contacts the cooled or heated water in well 12 for increased cooling or heating of the container contents.

It is desirable that inner wall 16 be made of light or thin material for rapid conduction of heat or cold. Walls 14 and 15 are made of stronger, heavier material to support the pipe coil 22, and the force of water in pathway 24 without buckling or collapsing.

In another embodiment of my invention as shown in Fig. 3, I provide a pipeline 52 leading from a water supply through pump 53 to the top of aisle 23. A pump 53 forces water in pipeline 52 to the top of aisle 23, where it is forced spirally downwardly in pathway 24 between coil 22 and walls 14 and 15, and is temperaturized by contact with coil 22 to a desired cold or warm temperature. Adjacent to the bottom of pathway 24, a conduit 54 leads the temperaturized water to sprays 50 which directs it against wall 16. A return pipe 55 is provided connecting well 12 with pipeline 52.

Having thus described my invention, I claim:

1. A liquid temperaturizing vat comprising an outer shell having a bottom well portion adapted to receive water, an intermediate wall spaced inwardly from said outer shell and leaving an aisle therebetween, a container having its bottom portion contacting said well, said container having a thin wall spaced from said intermediate wall and providing a space therebetween, a hollow pipe coil containing cold producing means positioned within said aisle, and extending spirally upwardly therein, said coil being of such a diameter as to fill said space laterally and contact said walls, said coil and said outer and intermediate walls forming a spiral pathway, return spray members communicating with the top of said pathway, an agitator rotatable within said container and having members contacting the wall thereof, and a pumping means for forcing the water in the well upwardly along said spiral pathway for providing cooled water, said spray return members directing said cooled water against the thin wall of the container for cooling the contents thereof, said water dropping back to said well for recirculation and for imparting cold to the lower portion of said container.

2. A liquid temperaturizing vat comprising a tank having a thin temperature conducting wall and bottom, an intermediate wall outwardly spaced from and surrounding the said thin wall, and providing a space therebetween, a jacket outwardly spaced from said intermediate wall and providing an aisle therebetween, a hollow pipe coil extending spirally upwardly in said aisle and contacting said intermediate wall and said jacket, thereby forming a spiral pathway, said jacket having a bottom well portion spaced below the bottom of said tank and adapted to receive liquid, return spray members positioned at the top of said pathway and leading to said space between the said thin wall and said intermediate wall, said coil adapted to contain a temperaturizing means, means for pumping the liquid in said well upwardly along said pathway for imparting a desired temperature to the liquid, said liquid adapted upon reaching the top of said pathway to pass into said return spray members and drop by gravity in the space between the intermediate wall and the thin wall, and against said thin wall to impart the desired temperature thereto, and by means of said wall to the contents of said tank, said liquid falling by gravity into said well, said liquid retaining desired temperature from contact with said coil for imparting the same to the bottom of the tank.

3. A liquid temperaturizing vat comprising a tank having a temperature conducting inner wall and bottom, an intermediate wall outwardly spaced from and surrounding the said inner wall, and providing a space therebetween, a jacket outwardly spaced from said intermediate wall and providing an aisle therebetween, a hollow pipe coil extending spirally upwardly in said aisle and contacting said intermediate wall and said jacket, thereby forming a spiral pathway, said jacket having a bottom well portion spaced below the bottom of said tank and adapted to receive liquid, spray members positioned at the top of said pathway and leading to said space between the said inner wall and said intermediate wall, said coil adapted to contain a temperaturizing means, means for pumping the liquid through said pathway for temperaturizing the same, means for conducting the temperaturized liquid to said spray members, said spray members adapted to spray the liquid against said inner wall to impart the desired temperature thereto, and by means of said wall to the contents of said tank, said liquid falling by gravity into said well, said liquid retaining desired temperature from contact with said coil for imparting the same to the bottom of the tank.

4. A liquid temperaturizing vat comprising a tank having a temperature conducting inner wall and bottom, an intermediate wall outwardly spaced from and surrounding the said inner wall, and providing a space therebetween, a jacket outwardly spaced from said intermediate wall and providing an aisle therebetween, a hollow pipe coil extending spirally upwardly in said aisle and contacting said intermediate wall and said jacket, thereby forming a spiral pathway, said jacket having a bottom well portion spaced below the bottom of said tank and adapted to receive liquid, spray members positioned at the top of said pathway and leading to said space between the said inner wall and said intermediate wall, said coil adapted to contain a temperaturizing means, a pipeline leading to the top of said pathway, a conduit adjacent to the bottom of said pathway and leading to said spray members, a pump for forcing liquid in said pipeline to the top of said pathway, and down said pathway to said conduit and up said conduit to said spray members, said spray members adapted to spray said liquid against said inner wall to impart the desired temperature thereto, and by means of said wall to the contents of said tank, said liquid falling by gravity into said well, said liquid retaining desired temperature from contact with said coil for imparting the same to the bottom of the tank, and a return pipe connecting said well with said pipeline.

FRANCIS J. McCULLOUGH.

REFERENCES CITED

The following references are of record in the file of this patent:

UNITED STATES PATENTS

| Number | Name | Date |
| --- | --- | --- |
| Re. 22,917 | Chamberlain | Sept. 23, 1947 |
| 574,930 | Murphy | Jan. 12, 1897 |
| 880,360 | Collins | Feb. 25, 1908 |
| 1,878,364 | Barrett | Sept. 20, 1932 |
| 1,982,570 | Cann | Nov. 27, 1934 |